(12) United States Patent
Molina Mutañola

(10) Patent No.: US 12,065,302 B2
(45) Date of Patent: Aug. 20, 2024

(54) BOX FOR TRANSPORTING VARIOUS PRODUCTS

(71) Applicant: SUMBOX WORLDWIDE SL, Barcelona (ES)

(72) Inventor: Pablo Molina Mutañola, Barcelona (ES)

(73) Assignee: SUMBOX WORLDWIDE SL, Barcelona (ES)

( * ) Notice: Subject to any disclaimer, the term of this patent is extended or adjusted under 35 U.S.C. 154(b) by 925 days.

(21) Appl. No.: 16/970,893

(22) PCT Filed: Apr. 2, 2019

(86) PCT No.: PCT/ES2019/070219
§ 371 (c)(1),
(2) Date: Aug. 18, 2020

(87) PCT Pub. No.: WO2019/175462
PCT Pub. Date: Sep. 19, 2019

(65) Prior Publication Data
US 2020/0407148 A1 Dec. 31, 2020

(30) Foreign Application Priority Data
Mar. 13, 2018 (ES) ................. ES201830349

(51) Int. Cl.
*B65D 81/38* (2006.01)
*B32B 3/12* (2006.01)
(Continued)

(52) U.S. Cl.
CPC ............ *B65D 81/3818* (2013.01); *B32B 3/12* (2013.01); *B32B 27/10* (2013.01); *B32B 27/30* (2013.01);
(Continued)

(58) Field of Classification Search
CPC .. B65D 81/3818; B65D 65/40; B65D 65/403; B65D 3/22; B32B 3/12
See application file for complete search history.

(56) References Cited

U.S. PATENT DOCUMENTS 4,057,444 A * 11/1977 Prot ....................... B65D 15/08
229/5.5
4,396,142 A * 8/1983 Lines, Jr. ................ B32B 15/20
220/88.1
(Continued)

FOREIGN PATENT DOCUMENTS

CN 204750796 11/2015
JP H10146906 6/1998
(Continued)

*Primary Examiner* — Jeffrey R Allen
(74) *Attorney, Agent, or Firm* — DP IP GROUP; Franco S. De Liguori

(57) ABSTRACT

A box for transporting various products has a prismatic body and a closing cover formed by a multilayered material including an intermediate thermal insulation board with an inner face and an outer face provided with an inner coating and an outer coating. The inner coating includes a paper sheet attached to the inner face of the intermediate board and a stiffening and waterproof sheet that forms the inner surface of the body and the cover. The outer coating includes a first layer made of strong printed paper or strong paper suitable for printing, a second paper layer, and a flexible and waterproof sheet made of recyclable polymer and arranged between the first and the second paper layers.

18 Claims, 1 Drawing Sheet

(51) Int. Cl.
*B32B 27/10* (2006.01)
*B32B 27/30* (2006.01)
*B65D 65/40* (2006.01)
*G01N 19/04* (2006.01)

(52) U.S. Cl.
CPC ............. *B65D 65/40* (2013.01); *G01N 19/04* (2013.01); *B32B 2307/304* (2013.01); *B32B 2307/726* (2013.01); *B32B 2439/62* (2013.01); *G01N 2203/0037* (2013.01); *G01N 2203/0067* (2013.01); *G01N 2203/0676* (2013.01)

(56) References Cited

U.S. PATENT DOCUMENTS

| | | | |
|---|---|---|---|
| 5,575,418 A * | 11/1996 | Wu | B65D 65/403 428/182 |
| 6,767,600 B1 | 7/2004 | Kasahara | |
| 2016/0137339 A1 * | 5/2016 | Molina-Muntañola | B32B 27/10 229/145 |
| 2017/0087810 A1 | 3/2017 | Schuman | |

FOREIGN PATENT DOCUMENTS

| | | |
|---|---|---|
| JP | 2003020066 A | 1/2003 |
| WO | WO 2011145806 | 11/2011 |
| WO | WO 2017089508 | 6/2017 |
| WO | WO 2017202494 | 11/2017 |

* cited by examiner

BOX FOR TRANSPORTING VARIOUS PRODUCTS

BACKGROUND

Field

The present invention relates to a box for transporting various products, such as food products or other products that require special protection during their transport and storage thereof, with regard to the waterproof and the stiffness of the box, for maintaining the internal temperature at the levels required by the product contained therein, for preventing internal or external moisture from affecting the consistency and stability of the box; and/or for enabling the box to be labelled or printed on the outside.

This invention is applicable in the sector of packaging, storage and transportation of various products and especially food products.

Background Information

Currently, several boxes intended mainly for transporting fish and other food products that must be kept in cold conditions for the preservation thereof are known.

Specifically, some boxes widely used for these uses are boxes made of expanded polystyrene also known as "white cork", which are waterproof and thermally insulated.

However, these boxes made of expanded polystyrene have certain drawbacks when used, among which it is worth mentioning: the low mechanical strength thereof with the consequent risk of breaking upon receiving impacts, and the need to have walls of at least 2 centimeters in order to ensure correct thermal insulation, such that during transportation a significant portion of the volume corresponds to the box and not to the product contained therein, this circumstance making the air transport of goods more expensive.

Another drawback is that these boxes made of expanded polystyrene are not collapsible and maintain a constant volume, whether they are empty or when they contain product, for which reason they require a large space for storage.

These boxes made of expanded polystyrene have an irregular outer surface that is not particularly suitable for performing printing with a certain quality and by conventional techniques on the outer surface of the box, usually resorting to the use of self-adhesive printed sheets for marking and identifying them, which make the final cost of the box more expensive.

Finally, it should be mentioned that another drawback of these boxes is that expanded polystyrene is a material which is harmful for the environment, since it takes hundreds of years to biodegrade.

Other prior art of boxes for food products are also known, such as the one described in the Spanish utility model ES1078709 U which comprises a prismatic body and a closing cover thereof, both being made of a board of corrugated cardboard with an inner face and an outer face covered by corresponding continuous and waterproof sheets made of polyethylene or vinyl polymer. With these features, the box in question has a series of advantages, such as the possibility of folding, with respect to the aforementioned boxes made of expanded polystyrene, although it does not have a high mechanical strength which ensures, for example, the stacking of several units on a pallet, nor performing quality prints by conventional techniques on the outer surface thereof.

Spanish utility model ES1079037U describes a box for food products comprising a prismatic body and a closing cover, made of a board of corrugated cardboard which has a continuous and waterproof coating on the outer and inner faces thereof, which is formed, on at least one of said faces, by a layer of waterproof paint; the coating of one of said faces may be a waterproof sheet made of polyethylene or vinyl polymer.

This box, despite fulfilling the purpose for which it was created, has some drawbacks when used, such as the possibility of the waterproof paint layer coming off due to scratching during transportation with the consequent loss of waterproofing of the corresponding side and consequently with the absorption of moisture and loss of consistency of the interior board of corrugated cardboard. Another drawback of this box is the difficulty in performing quality prints, by conventional techniques, on the outer surface thereof.

SUMMARY

The box for products object of this invention, having a prismatic body and a cover, has features aimed at satisfactorily solving the problems set out above and which enable it to offer the following properties: maintaining the internal temperature at the levels required by the product that it contains, for example, low temperatures for transporting fish and shellfish; which is 100% recyclable and has suitable robustness in order to withstand normal transportation practices, i.e., stacking boxes at several heights on pallets and loading and unloading operations; ensuring that the materials and the composition of the box are protected from external and internal moisture so that it does not deteriorate during use; enabling correct printing of the outer surface of the box by conventional techniques and directly, i.e., without requiring the use of additional elements such as self-adhesive printed sheets.

The box for food products object of the invention is of the type mentioned in the preamble of the first claim, i.e., it comprises a prismatic body provided with a closing cover, the body and cover being formed by a multilayered material including an intermediate thermal insulation board with an inner face and an outer face both respectively provided with an inner coating and an outer coating.

According to the invention, the inner coating comprises:—a paper sheet attached to the inner face of the intermediate thermal insulation board, and—a single-layered or multilayered stiffening and waterproof sheet made of vinyl or recyclable polymer that forms the inner surface of the box.

The intermediate thermal insulation board is made of cardboard and has hollow cavities arranged between two parallel walls and oriented parallel to said walls, as a corrugated cardboard; or transversely, as a honeycomb.

The intermediate thermal insulation board is responsible for ensuring that the product contained in the box is maintained in adequate temperature conditions.

The stiffening and waterproof sheet forming the inner surface of the body and the cover increases the mechanical strength of the box, further preventing moisture or liquids released by the product contained in the box from reaching and deteriorating the intermediate thermal insulation board.

The flexible and waterproof sheet of the outer coating provides the same protection against external moisture, but does not substantially increase the mechanical strength of the box precisely to prevent it from cracking during the folding and shaping of the prismatic body or the cover of the box.

The first strong paper layer of the outer coating, which forms the outer surface of the box, is an optimal surface for printing any graphic motif, even in high quality, by conventional printing techniques.

Preferably, the outer coating comprises, on the first strong paper layer forming the outer surface of the box, a transparent protective layer made of varnish, paraffin or similar, the purpose of which is to protect said paper layer and the motifs printed thereon from possible external moisture and scratching that could deteriorate the outer appearance of the box.

BRIEF DESCRIPTION OF THE DRAWINGS

As a complement to the description provided herein, and for the purpose of helping to make the features of the invention more readily understandable, the present specification is accompanied by a set of drawings which, for illustrative and non-limiting purposes, the following has been represented.

DETAILED DESCRIPTION

Figure 1:
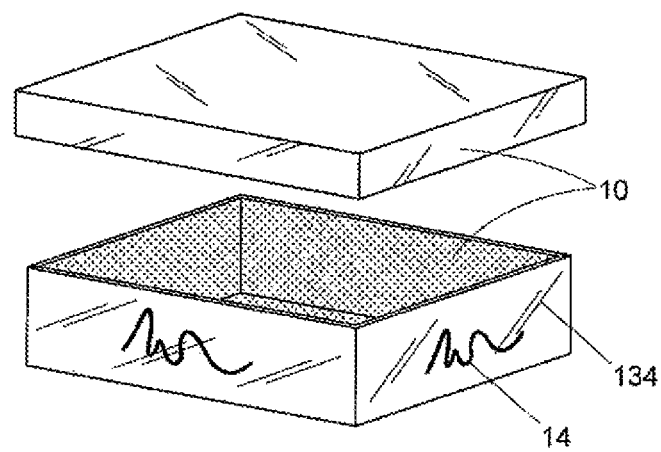
FIG. 1 shows a schematic view of an exemplary embodiment of the box for transporting various products according to the invention, with the cover separated from the body and provided on the outside with prints covered by a protective varnish layer.
Figure 2:
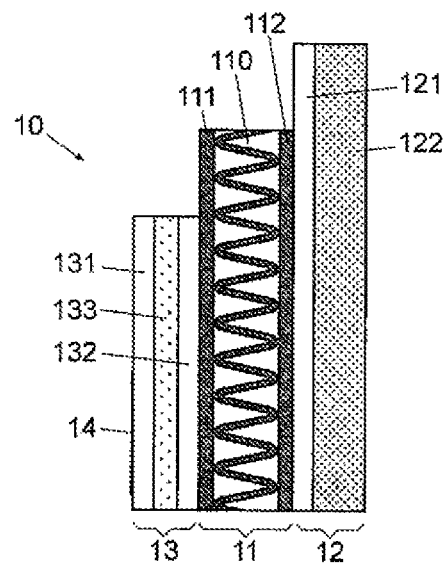
FIG. 2 shows a stepped cross section of a portion of the material forming the body and the cover of the box of the previous figure, without the protective varnish layer, the structure of the intermediate board and of the inner and outer coatings thereof being visible in this cross section.

In the exemplary embodiment shown in FIG. 1, a box for transporting various products according to the invention can be seen, provided with a prismatic body and a cover made entirely of a multilayered material (10), the cross section of which can be seen in FIG. 2.

This multilayered material comprises: an intermediate thermal insulation board (11); an inner coating (12) oriented towards the inside of the box and attached to the inner face of the intermediate board (11); and an outer coating (13) forming the outer surface of the box, attached to the outer face of said intermediate board (11).

In the example shown, the intermediate thermal insulation board (11) is formed by corrugated cardboard which has hollow cavities (110) oriented longitudinally and arranged between two parallel walls (111,112).

The inner coating (12) comprises a paper sheet (121) attached to the inner face of the intermediate board (11) and a stiffening and waterproof sheet (122) that forms the inner surface of the box and which, in this specific case, comprises one or more layers made of recyclable polymer, for example, polyethylene or polypropylene.

The outer coating (13) comprises: a first strong paper layer (131) which forms a printable outer surface; a second strong paper layer (132) attached to the intermediate thermal insulation board (11); and a flexible and waterproof sheet made of recyclable polymer (133) arranged between the two layers of paper (131 and 132).

As seen in FIG. 1, the first strong paper layer (131), forming the outer surface of the box, is suitable for printing various motifs (14); the outer coating (13) having in this specific example a protective varnish layer (134) which protects both the first layer of paper (131) and the motifs (14) printed thereon.

Having sufficiently described the nature of the invention, as well as an example of a preferred embodiment, it is hereby stated for the relevant purposes that the materials, shape, size and layout of the described elements may be modified, provided that it does not imply altering the essential features of the invention claimed below.

The invention claimed is:

1. A box for transporting various products comprising: a prismatic body and a closing cover formed by a multilayered material including an intermediate thermal insulation board with an inner face and an outer face, respectively provided with an inner coating and an outer coating, wherein:
   the inner coating comprises:
      a paper sheet attached to the inner face of the intermediate thermal insulation board; and
      a single-layered or multilayered stiffening and waterproof sheet made of vinyl or recyclable polymer that forms the inner surface of the box;
   the outer coating comprises:
      a first layer made of strong printed paper or strong paper suitable for printing, which forms an outer surface of the box;
      a second strong paper layer attached to the intermediate thermal insulation board; and
      a single-layered or multilayered flexible and waterproof sheet made of recyclable polymer arranged between the first and the second layers of strong paper;
   the inner coating and the outer coating cover the entire surface of the inner and outer faces of the intermediate thermal insulation board;
   for the inner coating, the paper sheet is attached directly to the inner face of the intermediate thermal insulation board and the stiffening and waterproof sheet is disposed directly on the paper sheet; and
   for the outer coating, the second strong paper layer is attached directly to the outer face of the intermediate thermal insulation board, the flexible and waterproof sheet is disposed directly on the second strong paper layer, and the first layer made of strong printed paper is disposed directly on the flexible and waterproof sheet.

2. The box according to claim 1, wherein the intermediate thermal insulation board is made of cardboard and has hollow cavities arranged between two parallel walls and oriented parallel to said walls, as a corrugated cardboard, or transversely, as a honeycomb.

3. The box according to claim 1, wherein the outer coating comprises on the first strong paper layer, forming the outer surface of the box, a protective layer made of varnish, paraffin or similar.

4. A box for containing and transporting products, the box comprising:
   a box body and a cover for covering an opening of the box body, each of the box body and the cover being formed of a thermal insulation board, an inner coating, and an outer coating;
   wherein the inner coating comprises a paper sheet disposed directly on an inner face of the thermal insulation board and a stiffening and waterproof sheet disposed directly on the paper sheet and forming an inner surface of the box body and an inner surface of the cover; and
   wherein the outer coating comprises a first layer made of high-strength paper forming an outer surface of the box body and an outer surface of the cover, a second layer of a high-strength paper disposed directly on an outer face of the thermal insulation board, and a flexible waterproof sheet disposed directly between the first and second layers of high-strength paper.

5. The box according to claim 4, wherein the stiffening and waterproof sheet of the inner coating is made of vinyl.

6. The box according to claim 4, wherein the stiffening and waterproof sheet of the inner coating is made of a recyclable polymer.

7. The box according to claim 4, wherein the first layer of the outer coating is suitable for printing.

8. The box according to claim 4, wherein the flexible waterproof sheet of the outer coating is made of a recyclable polymer.

9. The box according to claim 4, wherein the thermal insulation board is made of corrugated cardboard.

10. The box according to claim 4, wherein the thermal insulation board is made of corrugated cardboard and has hollow cavities arranged between and oriented parallel to two parallel walls.

11. The box according to claim 4, wherein the thermal insulation board is made of cardboard and has hollow cavities arranged between and oriented transversely to two parallel walls.

12. The box according to claim 4, wherein the outer layer further comprises a protective layer provided on the first layer.

13. The box according to claim 12, wherein the protective layer is made of varnish.

14. The box according to claim 12, wherein the protective layer is made of paraffin.

15. The box according to claim 1, wherein:
the body and the cover are configured to be folded and shaped to form the box for containing and transporting a product;
the intermediate thermal insulation board is configured for ensuring that the product contained in the box is maintained in adequate temperature conditions;
the stiffening and waterproof sheet of the inner coating is configured to increase a mechanical strength of the box to prevent any moisture or liquid released by the product contained in the box from reaching and deteriorating the intermediate thermal insulation board; and
the flexible and waterproof sheet of the outer coating is configured to prevent any moisture or liquid external from the box from reaching and deteriorating the intermediate thermal insulation board without increasing the mechanical strength of the box so as to prevent the box from cracking during its usage.

16. The box according to claim 4, wherein the inner coating and the outer coating cover all surfaces of the inner and outer faces of the thermal insulation board.

17. The box according to claim 4, wherein:
the body and the cover are configured to be folded and shaped to form the box for containing and transporting a product;
the thermal insulation board is configured for ensuring that the product contained in the box is maintained in adequate temperature conditions;
the stiffening and waterproof sheet of the inner coating is configured to increase a mechanical strength of the box to prevent any moisture or liquid released by the product contained in the box from reaching and deteriorating the thermal insulation board; and
the flexible and waterproof sheet of the outer coating is configured to prevent any moisture or liquid external to the box from reaching and deteriorating the thermal insulation board without increasing the mechanical strength of the box so as to prevent the box from cracking during its usage.

18. A box for containing and transporting products, the box comprising:
a body and a cover for covering an opening of the body, the body and the cover being configured to be folded and shaped to form the box for containing and transporting a product;
wherein each of the body and the cover is formed of a thermal insulation board, an inner coating attached to the thermal insulation board and forming an inner surface of the box, and an outer coating attached to the thermal insulation board and forming an outer surface of the box;
wherein the inner coating comprises a paper sheet disposed on an inner face of the thermal insulation board and a stiffening and waterproof sheet disposed on the paper sheet;
wherein the outer coating comprises a first layer made of high-strength paper forming an outer surface of the body, a second layer of a high-strength paper disposed on an outer face of the thermal insulation board, and a flexible waterproof sheet disposed between the first and second layers of high-strength paper;
wherein the insulation board is configured for ensuring that the product contained in the box is maintained in adequate temperature conditions;
wherein the stiffening and waterproof sheet of the inner coating is configured to increase a mechanical strength of the box to prevent any moisture or liquid released by the product contained in the box from reaching and deteriorating the thermal insulation board;
wherein the flexible and waterproof sheet of the outer coating is configured to prevent any moisture or liquid external to the box from reaching and deteriorating the thermal insulation board without increasing the mechanical strength of the box so as to prevent the box from cracking during its usage;
wherein for the inner coating, the stiffening and waterproof sheet is disposed directly on the paper sheet; and
wherein for the outer coating, the first layer is disposed directly on the flexible waterproof sheet, the flexible waterproof sheet is disposed directly on second layer, and the second layer is disposed on the outer surface of the thermal insulation board.

* * * * *